United States Patent
Amano et al.

(10) Patent No.: US 9,568,357 B2
(45) Date of Patent: Feb. 14, 2017

(54) DETECTION UNIT AND CONFOCAL LASER MICROSCOPE

(71) Applicant: OLYMPUS CORPORATION, Shibuya-ku, Tokyo (JP)

(72) Inventors: Yusuke Amano, Tokyo (JP); Masaharu Tomioka, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 44 days.

(21) Appl. No.: 14/539,760

(22) Filed: Nov. 12, 2014

(65) Prior Publication Data

US 2015/0146272 A1 May 28, 2015

(30) Foreign Application Priority Data

Nov. 22, 2013 (JP) ................. 2013-242123

(51) Int. Cl.
 *G02B 21/00* (2006.01)
 *G01J 1/04* (2006.01)
 *G02B 27/14* (2006.01)

(52) U.S. Cl.
 CPC .......... *G01J 1/0407* (2013.01); *G02B 21/008* (2013.01); *G02B 21/0064* (2013.01); *G02B 21/0032* (2013.01); *G02B 27/145* (2013.01)

(58) Field of Classification Search
 CPC ............ G02B 21/0032; G02B 21/0076; G02B 21/008; G02B 21/06; G02B 21/002; G02B 21/16; G02B 21/0024; G02B 21/082; G02B 26/0816; G02B 27/145; G01J 1/0403; G01J 1/0407
 USPC .......... 368/368, 385, 388, 389, 212.1–215.1; 250/16; 359/368, 385, 388, 389, 359/212.1–215.1
 See application file for complete search history.

(56) References Cited

U.S. PATENT DOCUMENTS

2010/0079857 A1 4/2010 Sasaki et al.
2011/0321204 A1* 12/2011 Karaki .................. B82Y 20/00
 850/32

FOREIGN PATENT DOCUMENTS

| EP | 1168029 A2 | 1/2002 |
|---|---|---|
| EP | 2146234 A1 | 1/2010 |
| EP | 2623957 A1 | 8/2013 |
| JP | 2002221663 A | 8/2002 |

OTHER PUBLICATIONS

Extended European Search Report dated Apr. 2, 2015, issued in counterpart European Application No. 14193475.2.

* cited by examiner

*Primary Examiner* — James Phan
(74) *Attorney, Agent, or Firm* — Holtz, Holtz & Volek PC

(57) ABSTRACT

The number of detection channels of detecting sections is increased and the detecting sections are replaced easily and at low cost while suppressing loss in the quantity of returning light. Provided is a detection unit (5A) including a detector entrance port (75A) through which light in a predetermined optical form enters, a detector (57A) that detects at least a portion of the light entering through the detector entrance port (75A), and a detector exit port (65A) through which at least another portion of the light entering through the detector entrance port (75A) can exit in the same optical form.

7 Claims, 14 Drawing Sheets

DETECTION UNIT AND CONFOCAL LASER MICROSCOPE

CROSS-REFERENCE TO RELATED APPLICATIONS

This application is based on Japanese Patent Application No. 2013-242123, the contents of which are incorporated herein by reference.

TECHNICAL FIELD

The present invention relates to detection units and confocal laser microscopes.

BACKGROUND ART

In the related art, a confocal laser microscope connected to a plurality of detecting sections, which detect light from a sample, is known (for example, see Patent Literature 1). In the confocal laser microscope discussed in Patent Literature 1, a detecting section is made attachable/detachable by providing an additional port within a detection unit connected to a scanner unit equipped with a scanner and a pinhole, or a plurality of detection units equipped with detecting sections are attachably/detachably connected to a scanner unit by using optical fibers so as to make the plurality of detecting sections replaceable.

CITATION LIST

Patent Literature

{PTL 1}
Japanese Unexamined Patent Application, Publication No. 2002-221663

SUMMARY OF INVENTION

When connecting a detecting section by using an internal additional port, as in the confocal laser scanning microscope discussed in Patent Literature 1, the number of detection channels that can be added is limited since it is possible to add only detecting sections equal in number to the number of internal additional ports provided in advance, and the degree of freedom for arranging the detecting sections is low. Furthermore, when connecting a plurality of detecting sections by using optical fibers, loss in the quantity of light occurs due to transmission loss in the optical fibers.

The present invention is to provide a detection unit and a confocal laser microscope in which the number of detection channels of detecting sections can be increased, and the detecting sections can be replaced easily and at low cost, while suppressing loss in the quantity of light.

A first aspect of the present invention provides a detection unit including a detector entrance port through which light in a predetermined optical form enters; a detecting section that detects at least a portion of the light entering through the detector entrance port; and a detector exit port through which at least another portion of the light entering through the detector entrance port can exit in the same optical form.

According to this aspect, at least a portion of the light entering through the detector entrance port is detected by the detecting section, whereas at least another portion of the light entering through the detector entrance port exits through the detector exit port. Therefore, by disposing one detection unit and another detection unit adjacently to each other while aligning the detector exit port of one detection unit with the detector entrance port of the other detection unit, light exiting through the detector exit port of one detection unit can enter through the detector entrance port of the other detection unit, so that at least a portion of the entering light can be detected by the detecting section.

As a result, by adding or replacing an adjacent detection unit, the number of detection channels can be increased, and the positions, that is, the arrangement order, of the detecting sections can be changed easily and at low cost.

In the above aspect, the detection unit may further include a splitter that splits an optical path of the light entering through the detector entrance port, causes light in one of the split optical paths to enter the detecting section, and causes light in another optical path to enter the detector exit port.

According to this configuration, with regard to the light whose optical path has been split by the splitter, a portion thereof is detected by the detecting section while the remaining portion exits outward through the detector exit port. Therefore, by adjusting the optical-path splitting performed by the splitter in each detection unit, desired light can be detected with a simple configuration.

In the above aspect, the light entering through the detector entrance port may have the optical form constituted of collimated light.

With this configuration, transmission loss of light is minimized between a scanner unit and a detection unit, as well as between detection units, whereby loss in the quantity of light can be suppressed.

In the above aspect, the detection unit may further include a relay optical system that relays the light entering through the detector entrance port without changing the predetermined optical form thereof.

According to this configuration, with the relay optical system, light can be made to enter another adjacently-disposed detection unit while suppressing an increase in beam diameter caused by a minor increase in angle of the collimated light. Consequently, the number of detecting sections can be increased while still maintaining the detection efficiency of the detecting section.

A second aspect of the present invention provides a confocal laser microscope including a scanner unit and a plurality of the aforementioned detection units. The scanner unit includes a scanning optical system and a scanner housing. The scanning optical system reflects illumination light emitted from a light source, scans the illumination light over a sample, reflects returning light from the sample at the same position as a reflecting position of the illumination light, and returns the returning light along an optical path of the illumination light. The scanner housing accommodates the scanning optical system therein and has a scanner exit port through which the returning light returned along the optical path of the illumination light by the scanning optical system exits outward in a predetermined optical form. Each of the detection units includes a detector housing that accommodates the detecting section therein and that has the detector entrance port and the detector exit port. The scanner housing and each detector housing are configured to be detachably attachable to each other so that, when attached to each other, optical axes of returning light exiting through the scanner exit port and returning light entering through the detector entrance port are aligned. The detector housings are configured to be detachably attachable to each other so that, when attached to each other, optical axes of returning light exiting through the detector exit port and returning light entering through the detector entrance port are aligned.

According to this aspect, the detector housing of any one of the detection units is attached to the scanner housing of the scanner unit such that returning light can enter and exit without changing the predetermined optical form thereof, and the detector housings of the detection units are attached to each other such that returning light can sequentially enter and exit without changing the predetermined optical form thereof. Then, illumination light emitted from the light source is scanned over the sample by the scanning optical system of the scanner unit, and returning light from the sample exits through the scanner exit port via the scanning optical system. Furthermore, the returning light exiting through the scanner exit port sequentially enters the detection units via the detector entrance ports. In each detection unit, at least a portion of the returning light is detected by the detecting section, whereas another portion of the returning light exits through the detector exit port.

In this case, with regard to the scanner unit and each detection unit that are attached to each other, the optical axes of returning light exiting through the scanner exit port and returning light entering through the detector entrance port are aligned with each other. Furthermore, with regard to the detection units that are attached to each other, the optical axes of returning light exiting through the detector exit port and returning light entering through the detector entrance port are aligned with each other. Therefore, the plurality of detection units can be sequentially disposed adjacently to each other while maintaining the effective beam diameters in the detection optical systems. Consequently, the number of detection channels can be freely increased without causing vignetting of returning light, and the positions, that is, the arrangement order, of the detecting sections can be freely changed. Moreover, since the scanner unit and each detection unit are directly connected to each other, or the detection units are directly connected to each other, transmission loss of light, as in a case where the connection is made using a fiber, can be prevented.

Consequently, the number of detection channels of the detecting sections can be increased, and the detecting sections can be replaced easily and at low cost, while suppressing loss in the quantity of returning light.

In the above aspect, the scanner unit may include a pinhole disposed at a position conjugate with respect to the sample, and the pinhole may limit a bundle of rays of the returning light exiting through the scanner exit port.

With this configuration, the pinhole allows only the returning light generated at the focal position of the illumination light on the sample to pass therethrough. The returning light then exits through the scanner exit port so that at least a portion of the returning light can be detected by the detection units. Consequently, the focal position of the illumination light on the sample can be observed with high precision.

In the above aspect, each detector may be configured so that the detector entrance port and the detector exit port are disposed in the optical axis of the returning light exiting through the scanner exit port in a state where each detector housing is attached to the scanner housing. Moreover, each detector may be configured so that the detector entrance port and the detector exit port are disposed in the optical axis of the returning light exiting through the detector exit port of the other detector housing in a state where the detector housing is attached to another detector housing.

With this configuration, the connection between the scanner unit and any one of the detection units, as well as the connection between the plurality of detection units, can be simplified.

The present invention is advantageous in that the number of detection channels of detecting sections can be increased and the detecting sections can be replaced easily and at low cost while suppressing loss in the quantity of returning light.

DESCRIPTION OF EMBODIMENTS

First Embodiment

A detection unit and a confocal laser microscope according to a first embodiment of the present invention will be described below with reference to the drawings.

Figure 1:
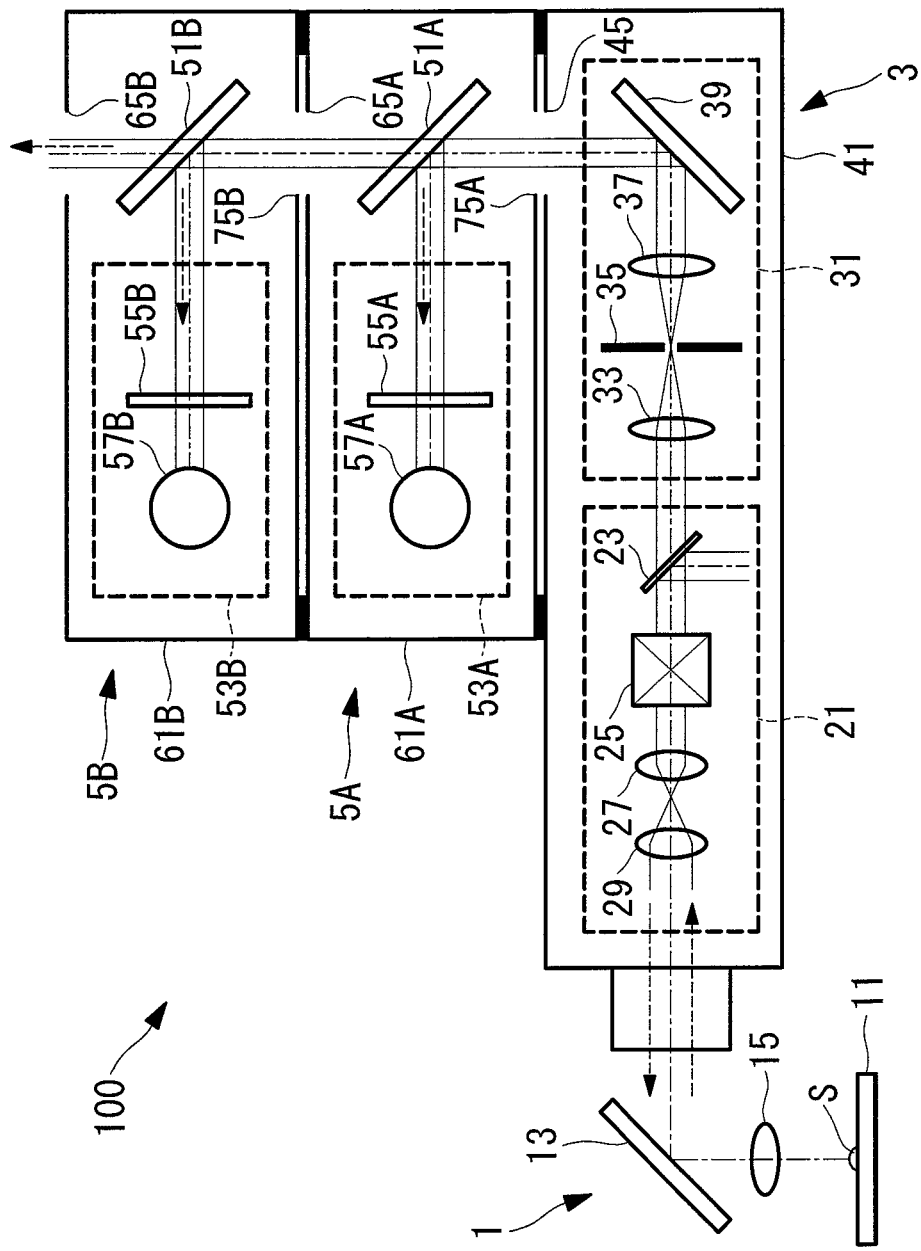
FIG. 1 is a vertical sectional view illustrating detection units and a confocal laser microscope according to a first embodiment of the present invention.
Figure 2:
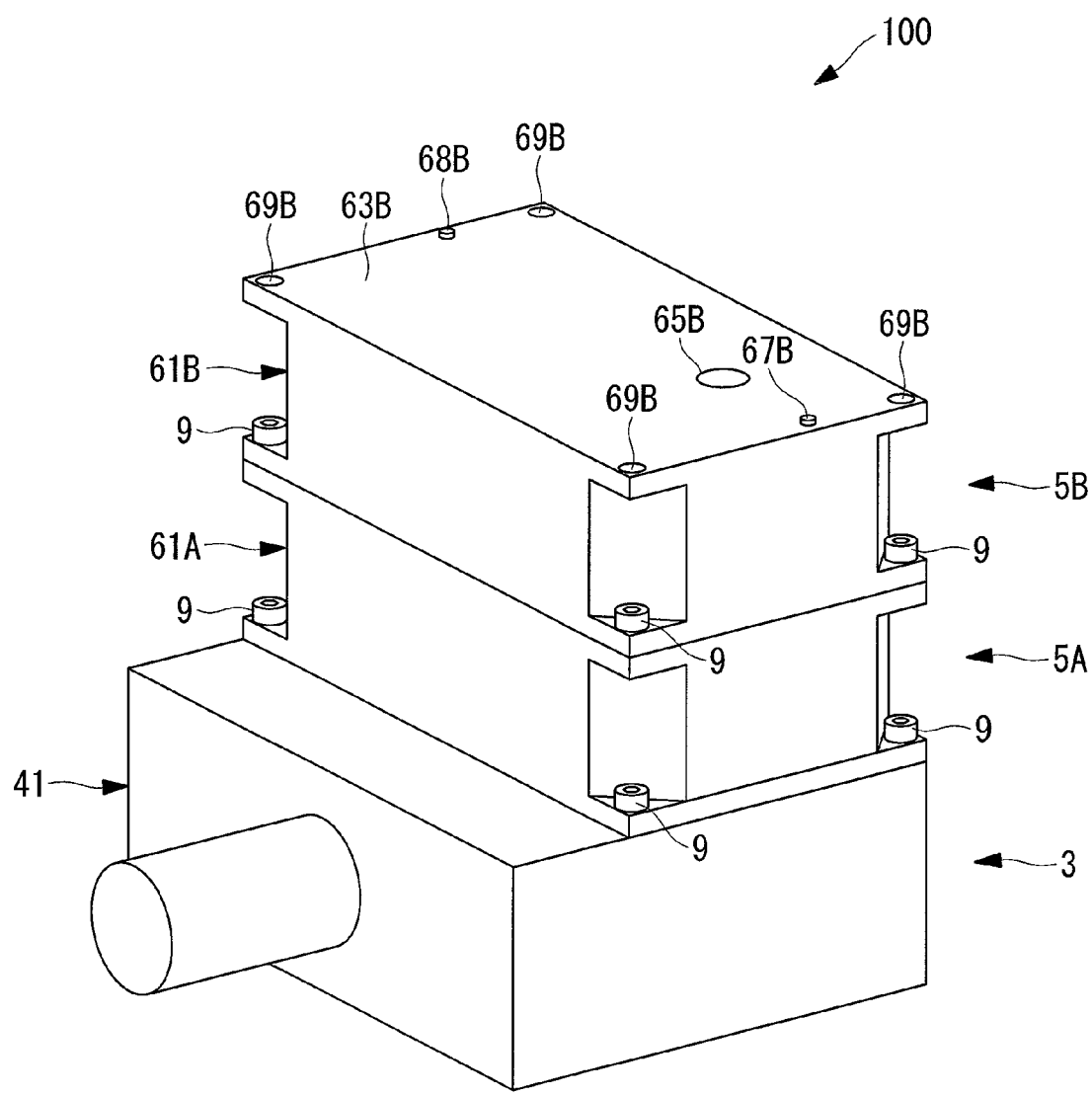
FIG. 2 is a perspective view illustrating a state where a scanner unit, a first detection unit, and a second detection unit in FIG. 1 are stacked and attached one on top of another.

As shown in FIGS. 1 and 2, a confocal laser microscope 100 according to this embodiment includes a microscope body 1 that irradiates a sample S with illumination light emitted from a light source (not shown), a scanner unit 3 that scans the illumination light radiated onto the sample S by the microscope body 1, and a first detection unit 5A and a second detection unit 5B that detect signal light (returning light), such as fluorescence, generated in the sample S as a result of irradiation with the illumination light.

The microscope body 1 includes a stage 11 on which the sample S is placed, a reflecting mirror 13 that reflects the illumination light scanned by the scanner unit 3, and an objective lens 15 that irradiates the sample S with the illumination light reflected by the reflecting mirror 13 and that collects the signal light from the sample S and returns the signal light along an optical path of the illumination light.

Figure 3:
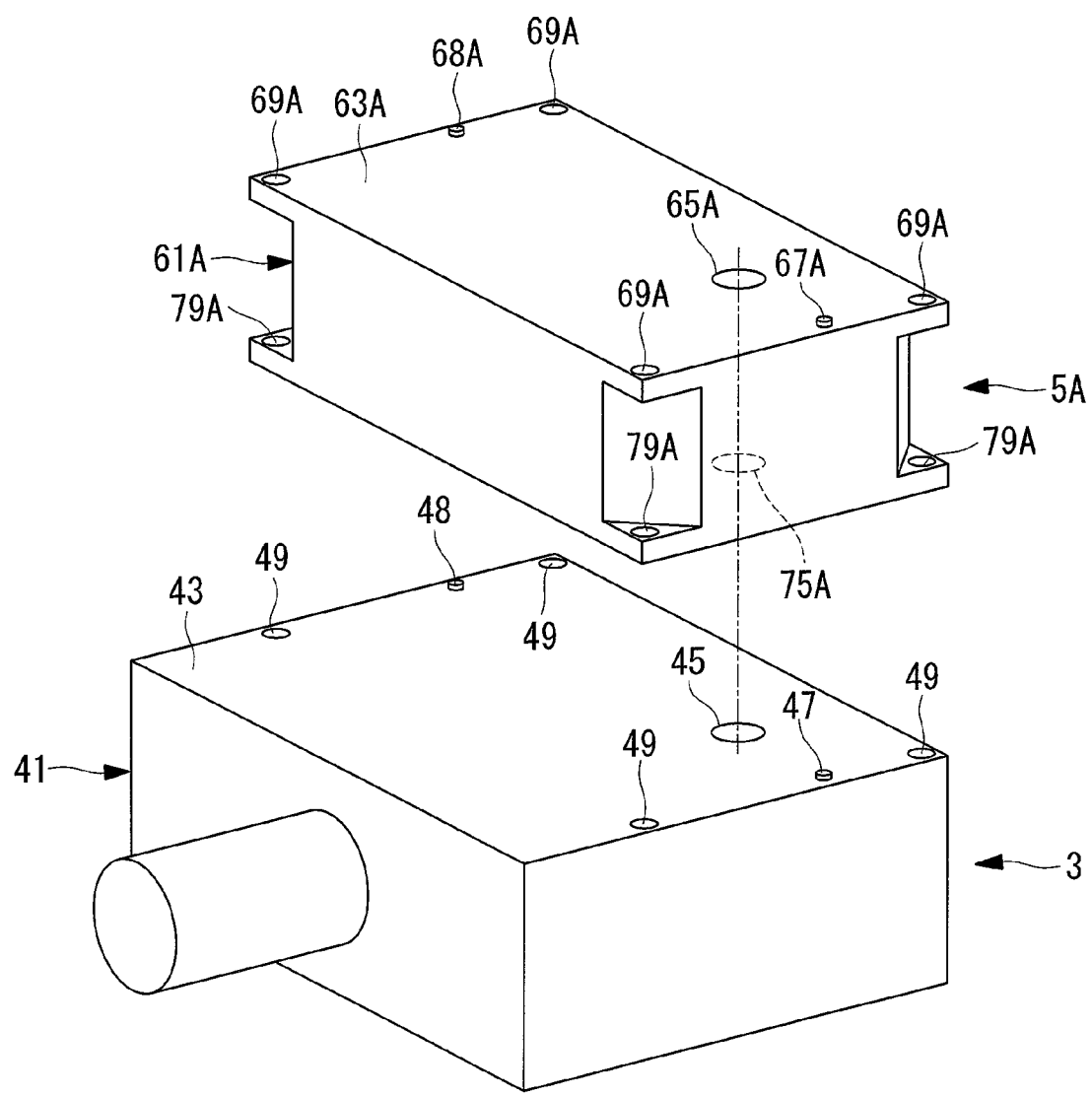
FIG. 3 illustrates a state where the scanner unit and the first detection unit in FIG. 1 are detached from each other.

As shown in FIG. 3, the scanner unit 3 is attachable to and detachable from the first detection unit 5A. Furthermore, as shown in FIGS. 1 and 3, the scanner unit 3 includes a scanning optical system 21, a pinhole optical system 31, and a substantially-rectangular-block-shaped scanner housing 41 that accommodates the scanning optical system 21 and the pinhole optical system 31 therein.

The scanning optical system 21 includes a dichroic mirror 23 that reflects the illumination light from the light source, a scanner 25 that deflects the illumination light reflected by the dichroic mirror 23, a pupil projection lens 27 that converges the illumination light deflected by the scanner 25, and an imaging lens 29 that converts the illumination light converged by the pupil projection lens 27 into collimated light and causes the collimated light to enter the microscope body 1.

The scanner 25 is, for example, a two-axis galvanometer mirror constituted of a pair of galvanometer mirrors (not shown) that are rotatable about axes extending orthogonally to each other. With the pair of galvanometer mirrors, the scanner 25 reflects the illumination light from the dichroic mirror 23, scans the illumination light two-dimensionally (i.e., in the X-axis direction and the Y-axis direction) over the sample S, and reflects the signal light returning from the sample S via the objective lens 15 at the same position as the reflecting position of the illumination light so as to return (i.e., de-scan) the signal light to the dichroic mirror 23.

The dichroic mirror 23 reflects the illumination light toward the scanner 25 and transmits the signal light returning via the scanner 25 so as to cause the signal light to enter the pinhole optical system 31.

The pinhole optical system 31 includes a confocal lens 33 that converges the signal light transmitted through the dichroic mirror 23, a pinhole 35 that limits passing of the signal light converged by the confocal lens 33, a collimating lens 37 that converts the signal light passed through the pinhole 35 into collimated light, and a reflecting mirror 39 that reflects the signal light converted into the collimated light to the outside.

The pinhole 35 is disposed at a position conjugate with respect to the sample S. Of the signal light converged by the confocal lens 33, the pinhole 35 is capable of allowing only the signal light generated at the focal position of the objective lens 15 on the sample S to pass therethrough.

Figure 4:
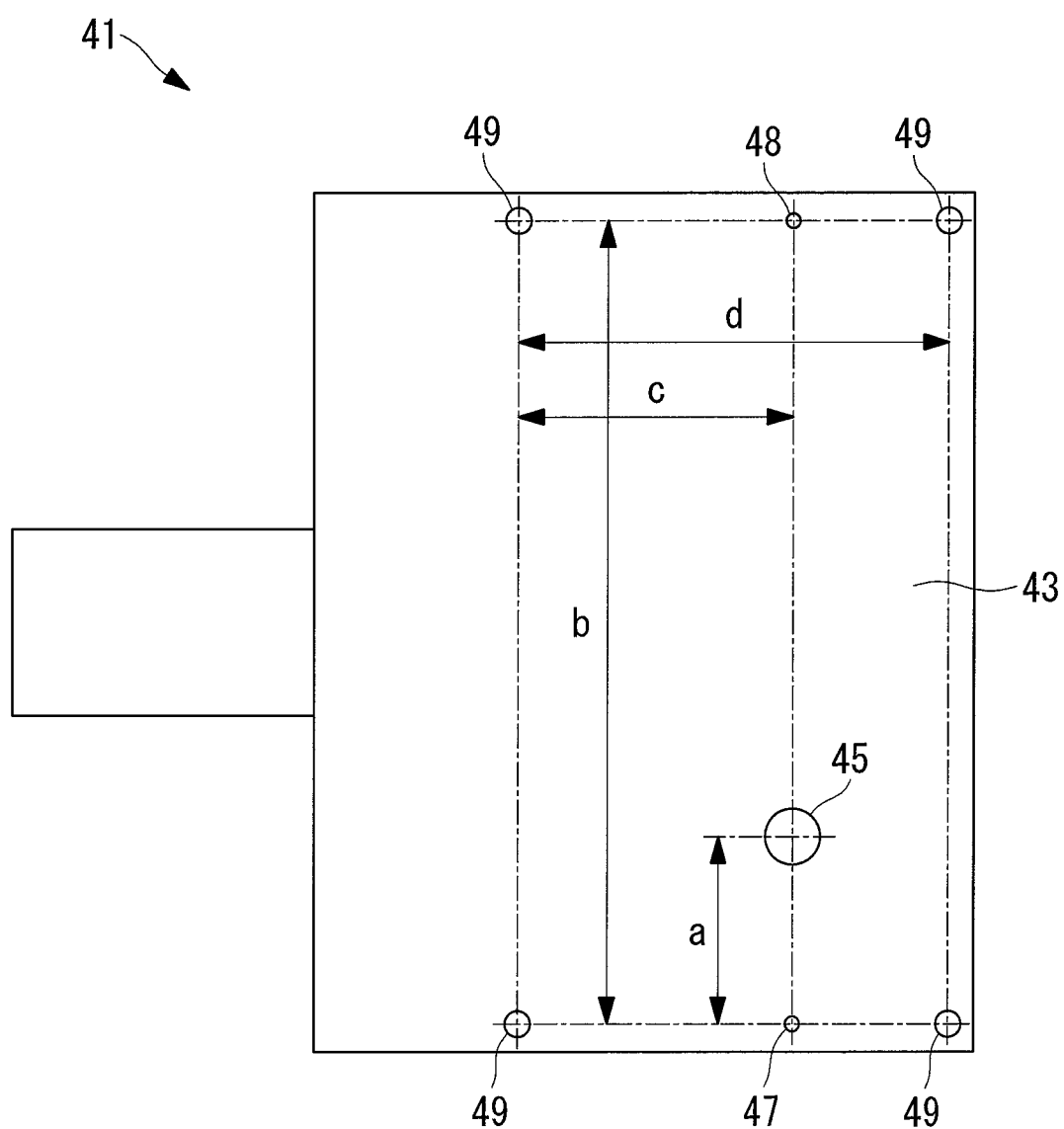
FIG. 4 illustrates an upper surface of a scanner housing in FIG. 1, as viewed from above in the height direction.

In the scanner housing 41, the scanning optical system 21 and the pinhole optical system 31 are arranged such that the optical systems are spaced apart from each other in the widthwise direction of the scanner housing 41. As shown in FIGS. 3 and 4, the scanner housing 41 has a substantially-flat upper surface 43 that is parallel to the lower surface. The upper surface 43 is provided with a scanner exit port 45 that extends therethrough in the thickness direction and through which the signal light reflected by the reflecting mirror 39 exits to the outside in a predetermined optical form.

Furthermore, the upper surface 43 is provided with two positioning pins 47 and 48 protruding toward the side opposite from the lower surface, as well as four taps 49 to which securing screws 9 (see FIG. 2) are fastenable. The two positioning pins 47 and 48 are respectively disposed near opposite ends of the scanner housing 41 in the lengthwise direction. With regard to the four taps 49, two of them are provided near each end of the scanner housing 41 in the lengthwise direction and are spaced apart from each other in the widthwise direction of the scanner housing 41.

In FIG. 4, reference character a denotes the distance between the scanner exit port 45 and the positioning pin 47 in the lengthwise direction of the scanner housing 41. Furthermore, reference character b denotes the distance between the positioning pins 47 and 48 and also the distance between two of the taps 49 in the lengthwise direction of the scanner housing 41. Moreover, reference character c denotes the distance between the scanner exit port 45 and one of the taps 49 in the widthwise direction of the scanner housing 41. Furthermore, reference character d denotes the distance between two of the taps 49 in the widthwise direction of the scanner housing 41.

The first detection unit 5A and the second detection unit 5B have identical configurations and are attachable to and detachable from each other. Specifically, as shown in FIGS. 1 and 3, these detection units 5A and 5B include splitters 51A and 51B that are capable of splitting the optical path of the signal light, detection optical systems 53A and 53B that detect the signal light in one of the optical paths split by the splitters 51A and 51B, and substantially-rectangular-block-shaped detector housings 61A and 61B that accommodate the splitters 51A and 51B and the detection optical systems 53A and 53B therein, respectively. FIG. 3 illustrates the first detection unit 5A as an example.

Each of the splitters 51A and 51B is, for example, a dichroic mirror, a reflecting mirror, or a plain glass member. These splitters 51A and 51B reflect at least a portion of the signal light toward the detection optical systems 53A and 53B and transmit the remaining portion of the signal light.

In this embodiment, dichroic mirrors formed of flat parallel plates are used as the splitters 51A and 51B, and the dichroic mirrors are tilted at 45° relative to the optical axis of the signal light.

Furthermore, in place of the dichroic mirrors used as the splitters 51A and 51B, for example, other dichroic mirrors, reflecting mirrors, or plain glass members may be selectively inserted into the optical path by using turrets (not shown) so as to be used as the splitters 51A and 51B. By switching among, for example, dichroic mirrors, reflecting mirrors, or plain glass members used as the splitters 51A and 51B, the wavelength of signal light to be split can be appropriately changed.

The detection optical systems 53A and 53B include barrier filters 55A and 55B that block light in an excitation wavelength band included in the signal light reflected by the splitters 51A and 51B and transmit only fluorescence with a predetermined wavelength, and also include detectors (detecting sections) 57A and 57B that detect the fluorescence transmitted through the barrier filters 55A and 55B.

Each of the detectors 57A and 57B is, for example, a photomultiplier tube and outputs an electric signal in accordance with the intensity of the detected fluorescence. These detectors 57A and 57B have, for example, detection wavelength bands and detection sensitivities that are different from each other.

Figure 5:
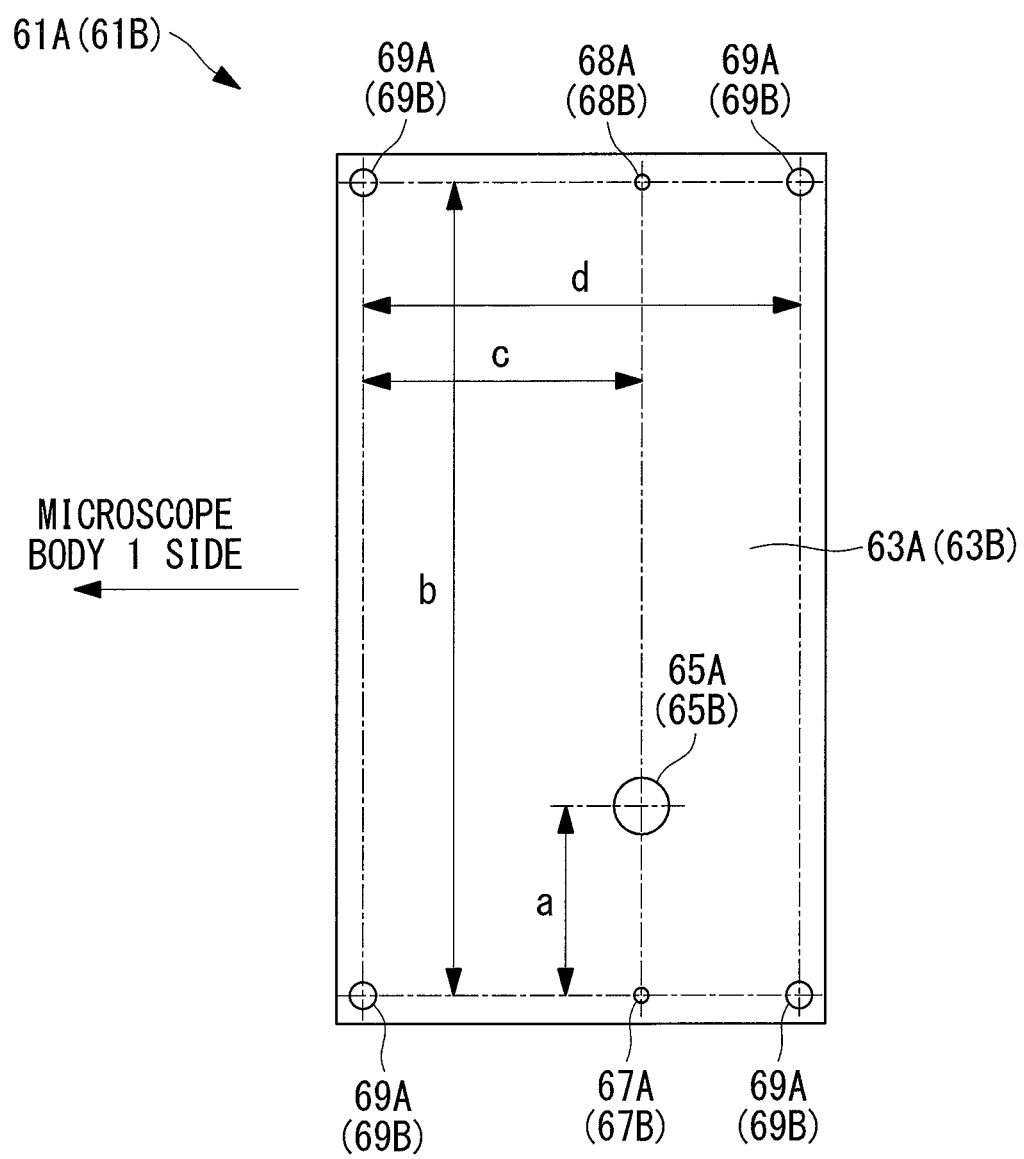
FIG. 5 illustrates an upper surface of a detector housing in FIG. 1, as viewed from above in the height direction.
Figure 6:
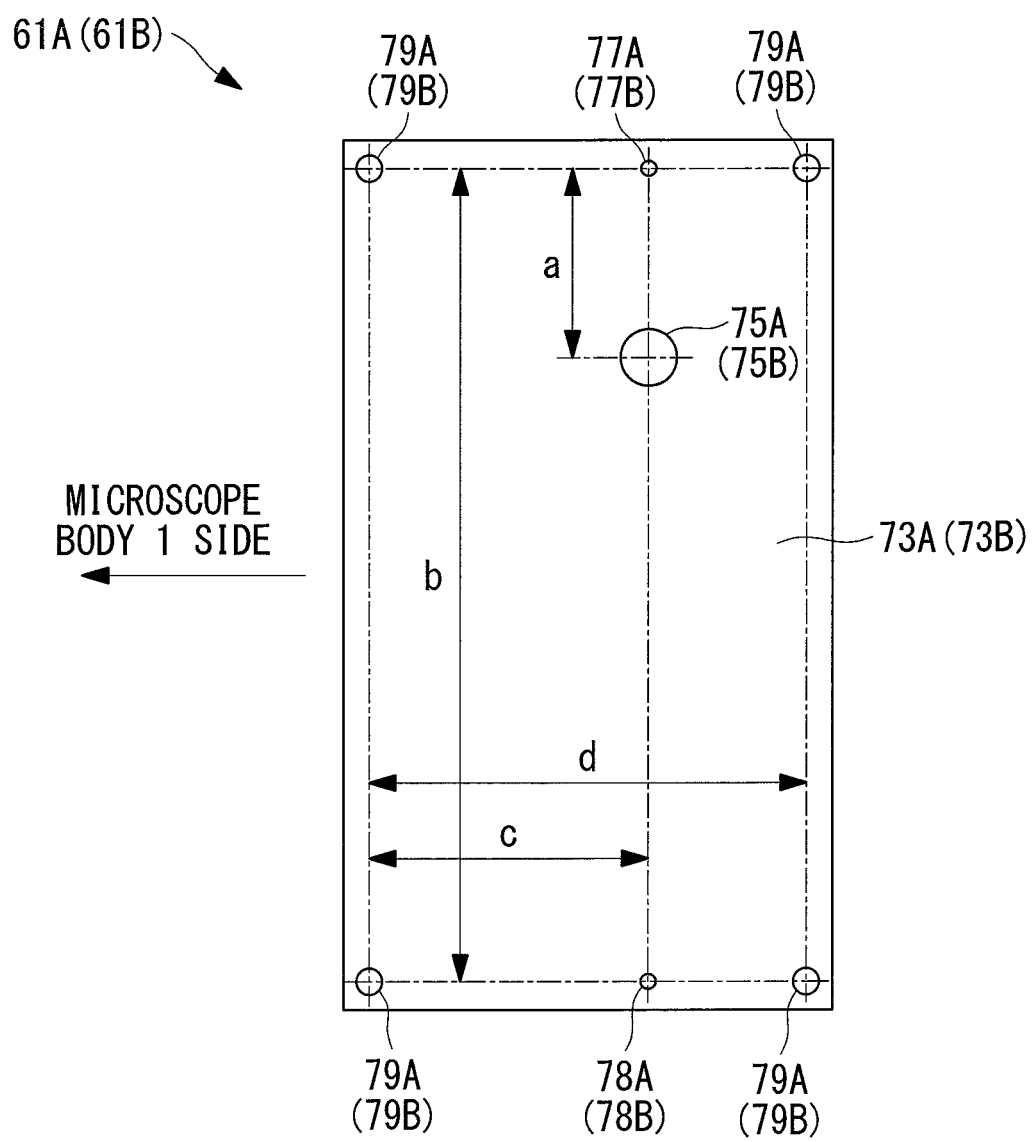
FIG. 6 illustrates a lower surface of the detector housing in FIG. 1, as viewed from below in the height direction.

In the detector housings 61A and 61B, the splitters 51A and 51B and the detection optical systems 53A and 53B are arranged such that the optical systems are spaced apart from each other in the widthwise direction of the detector housings 61A and 61B, respectively. As shown in FIGS. 5 and 6, the detector housings 61A and 61B respectively have substantially-flat upper surfaces 63A and 63B and lower surfaces 73A and 73B that are parallel to each other.

The upper surfaces 63A and 63B are provided with detector exit ports 65A and 65B, respectively, through which the signal light transmitted through the splitters 51A and 51B can exit in identical optical forms. Furthermore, each of the upper surfaces 63A and 63B is provided with two positioning pins 67A or 67B and 68A or 68B protruding toward the side opposite from the lower surface 73A or 73B, as well as four taps 69A or 69B to which the securing screws 9 are fastenable.

As shown in FIG. 5, the two positioning pins 67A or 67B and 68A or 68B are respectively disposed near opposite ends of the detector housing 61A or 61B in the lengthwise direction. The four taps 69A or 69B are respectively disposed at four corners of the detector housing 61A or 61B.

With reference to the detector exit port 65A or 65B, the two positioning pins 67A or 67B and 68A or 68B have the same positional relationship and the same distance dimensions as the two positioning pins 47 and 48 of the scanner housing 41 with reference to the scanner exit port 45. Furthermore, with reference to the detector exit port 65A or 65B, the four taps 69A or 69B have the same positional relationship and the same distance dimensions as the four taps 49 of the scanner housing 41 with reference to the scanner exit port 45.

As shown in FIG. 6, the lower surfaces 73A and 73B of the detector housings 61A and 61B are provided with detector entrance ports 75A and 75B, respectively, through which the signal light can enter from the outside without changing the optical form thereof. These detector entrance ports 75A and 75B are arranged such that the optical axis of entering signal light is coaxial with the optical axis of signal light exiting through the detector exit ports 65A and 65B.

Each of the lower surfaces 73A and 73B is provided with an engagement hole 77A or 77B into which the positioning pin 47 of the scanner housing 41 and the positioning pin 67A or 67B of the detector housing 61A or 61B are insertable, a elongated hole 78A or 78B into which the positioning pin 48 of the scanner housing 41 and the positioning pin 68A or 68B of the detector housing 61A or 61B are insertable, and four screw holes 79A or 79B through which the securing screws 9 are extendable.

The engagement hole 77A or 77B and the elongated hole 78A or 78B are respectively disposed near the opposite ends of the detector housing 61A or 61B in the lengthwise direction. The four screw holes 79A or 79B are respectively disposed at four corners of the detector housing 61A or 61B.

In FIG. 6, reference character a denotes the distance between the detector entrance port 75A or 75B and the engagement hole 77A or 77B in the lengthwise direction of the detector housing 61A or 61B. Furthermore, reference character b denotes the distance between the engagement hole 77A or 77B and the elongated hole 78A or 78B and also the distance between two of the screw holes 79A or 79B in the lengthwise direction of the detector housing 61A or 61B. Moreover, reference character c denotes the distance between the detector entrance port 75A or 75B and one of the screw holes 79A or 79B in the widthwise direction of the detector housing 61A or 61B. Furthermore, reference character d denotes the distance between two of the screw holes 79A or 79B in the widthwise direction of the detector housing 61A or 61B.

Specifically, the engagement hole 77A or 77B and the elongated hole 78A or 78B have a positional relationship and distance dimensions that correspond to those of the two positioning pins 47 and 48 of the scanner housing 41, as well as the positioning pin 67A or 67B and the positioning pin 68A or 68B of the other detector housing 61A or 61B.

Moreover, the four screw holes 79A or 79B have positional relationships and distance dimensions that correspond to those of the four taps 49 of the scanner housing 41, as well as the four taps 69A or 69B of the other detector housing 61A or 61B.

Therefore, when the scanner housing 41 and the detector housing 61A are disposed adjacently to each other such that the two positioning pins 47 and 48 of the scanner unit 3 are positioned by being respectively inserted into the engagement hole 77A and the elongated hole 78A in the first detection unit 5A and such that the four taps 49 of the scanner unit 3 are respectively aligned with the four screw holes 79A in the first detection unit 5A, the scanner exit port 45 of the scanner unit 3 can be aligned with the detector entrance port 75A of the first detection unit 5A.

Figure 7:
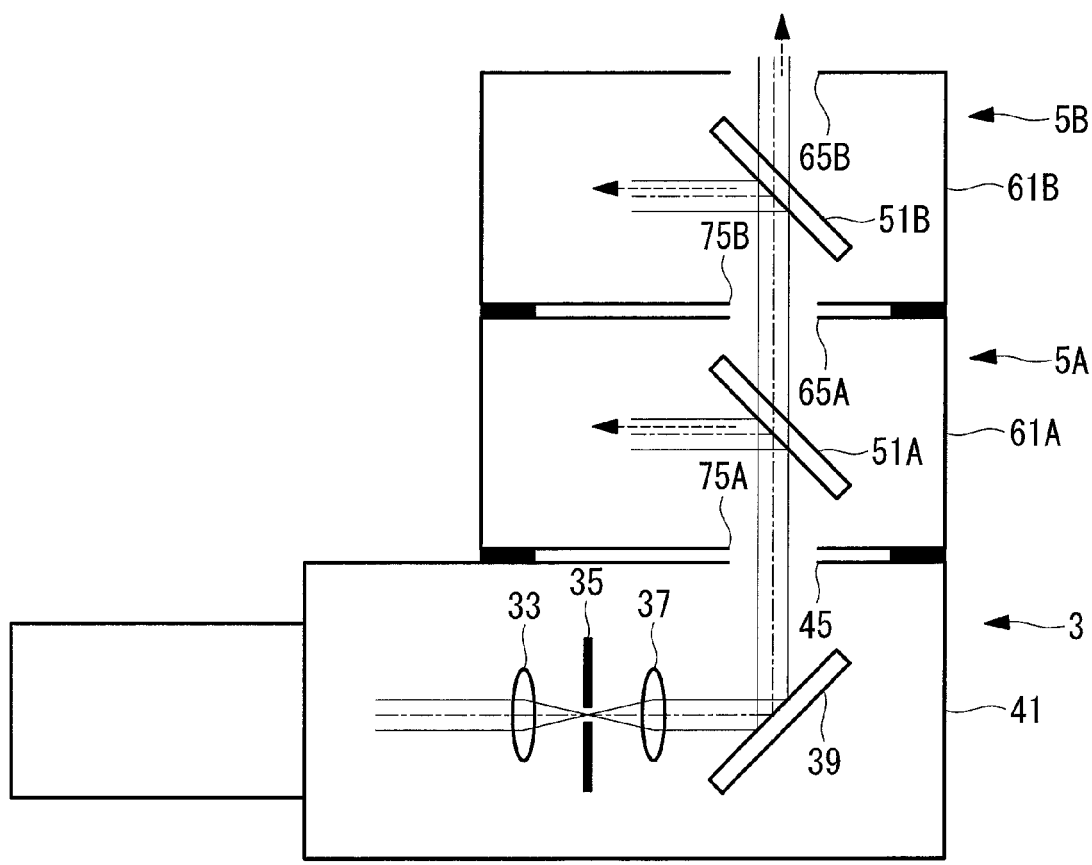
FIG. 7 is a vertical sectional view of the scanner unit, the first detection unit, and the second detection unit in FIG. 2.

Then, as shown in FIG. 7, the securing screws 9 are inserted through the screw holes 79A in the first detection unit 5A and are fastened thereto by using the taps 49 of the scanner unit 3, whereby the scanner housing 41 and the detector housing 61A can be secured to each other such that the optical axes of signal light exiting through the scanner exit port 45 of the scanner unit 3 and signal light entering through the detector entrance port 75A of the first detection unit 5A are aligned with each other.

Furthermore, when the detector housings 61A and 61B are disposed adjacently to each other such that the two positioning pins 67A and 68A of the first detection unit 5A are positioned by being respectively inserted into the engagement hole 77B and the elongated hole 78B in the second detection unit 5B and such that the four taps 69A of the first detection unit 5A are respectively aligned with the four screw holes 79B in the second detection unit 5B, the detector exit port 65A of the first detection unit 5A can be aligned with the detector entrance port 75B of the second detection unit 5B.

Then, as shown in FIG. 7, the securing screws 9 are inserted through the screw holes 79B in the second detection unit 5B and are fastened thereto by using the taps 69A of the first detection unit 5A, whereby the detector housings 61A and 61B can be secured to each other such that the optical axes of signal light exiting through the detector exit port 65A of the first detection unit 5A and signal light entering through the detector entrance port 75B of the second detection unit 5B are aligned with each other.

The operation of the detection units 5A and 5B and the confocal laser microscope 100 having the above-described configuration will now be described with reference to FIG. 1.

In order to observe the sample S by using the confocal laser microscope 100 according to this embodiment, the detector housing 61A of the first detection unit 5A is attached to the scanner housing 41 of the scanner unit 3 such that signal light can enter and exit without changing the predetermined optical form thereof. Furthermore, the detector housings 61A and 61B of the detection units 5A and 5B are attached to each other such that the signal light can sequentially enter and exit without changing the predetermined optical form thereof.

Then, the sample S is placed on the stage 11, and illumination light emitted from the light source is made to enter the scanner unit 3. The illumination light entering the scanner unit 3 is reflected by the dichroic mirror 23 and deflected by the scanner 25, and is subsequently converged by the pupil projection lens 27 and converted into collimated light by the imaging lens 29 before entering the microscope body 1.

The illumination light entering the microscope body 1 is reflected by the reflecting mirror 13 and is radiated onto the sample by the objective lens 15. Thus, the illumination light is two-dimensionally scanned over the focal plane of the sample S in accordance with the swivel angles of the pair of galvanometer mirrors of the scanner 25.

Signal light generated in the sample S as a result of irradiation with the illumination light is collected by the objective lens 15. Subsequently, the signal light travels back along the optical path of the illumination light via the reflecting mirror 13, the imaging lens 29, and the pupil projection lens 27, is de-scanned by the scanner 25, and is transmitted through the dichroic mirror 23.

The signal light transmitted through the dichroic mirror 23 is converged by the confocal lens 33, and only the signal light generated at the focal position of the objective lens 15 on the sample passes through the pinhole 35 and is converted into collimated light by the collimating lens 37. Then, the signal light converted into collimated light is reflected by the reflecting mirror 39 and exits outward in the form of a collimated beam through the scanner exit port 45.

The signal light exiting through the scanner exit port 45 enters the detector housing 61A in the form of a collimated beam through the detector entrance port 75A of the first detection unit 5A, and the splitter 51A splits the optical path in accordance with the wavelength. Signal light with a predetermined wavelength reflected by the splitter 51A is detected by the detector 57A via the barrier filter 55A. Signal light with other wavelengths transmitted through the splitter 51A exits outward in the form of a collimated beam through the detector exit port 65A.

The signal light exiting through the detector exit port 65A enters the detector housing 61B in the form of a collimated beam through the detector entrance port 75B of the second detection unit 5B, and the splitter 51B splits the optical path in accordance with the wavelength. Signal light with a predetermined wavelength reflected by the splitter 51B is detected by the detector 57B via the barrier filter 55B. Signal light with other wavelengths transmitted through the splitter 51B exits outward in the form of a collimated beam through the detector exit port 65B.

As described above, with the detection units 5A and 5B and the confocal laser microscope 100 according to this embodiment, the optical axes of the signal light exiting through the scanner exit port 45 of the scanner unit 3 and the signal light entering through the detector entrance port 75A of the first detection unit 5A are aligned with each other between the scanner unit 3 and the first detection unit 5A that are attached to each other. Furthermore, the optical axes of the signal light exiting through the detector exit port 65A of the first detection unit 5A and the signal light entering through the detector entrance port 75B of the second detection unit 5B are aligned with each other between the detection units 5A and 5B that are attached to each other. Therefore, a plurality of detection units 5A and 5B can be sequentially disposed adjacently to each other while maintaining the effective beam diameters in the detection optical systems 53A and 53B. In addition, the number of detection channels can be freely increased without causing vignetting of returning light, and the positions of the detection unit 5A (detector 57A) and the detection unit 5B (detector 57B) can be freely changed. Moreover, since the scanner unit 3 and the first detection unit 5A are directly connected to each other or the detection units 5A and 5B are directly connected to each other, transmission loss of light, as in a case where the connection is made using a fiber, can be prevented.

Consequently, the number of detection channels in the confocal laser microscope 100 can be increased and the detectors 57A and 57B can be positionally replaced easily and at low cost while suppressing loss in the quantity of signal light. In a confocal laser microscope that only handles on-axis light beams, for example, even if the length of the optical path is largely increased by adding multiple detection units, a problem of an insufficient quantity of ambient light caused by vignetting of off-axis light beams does not occur.

Figure 8:
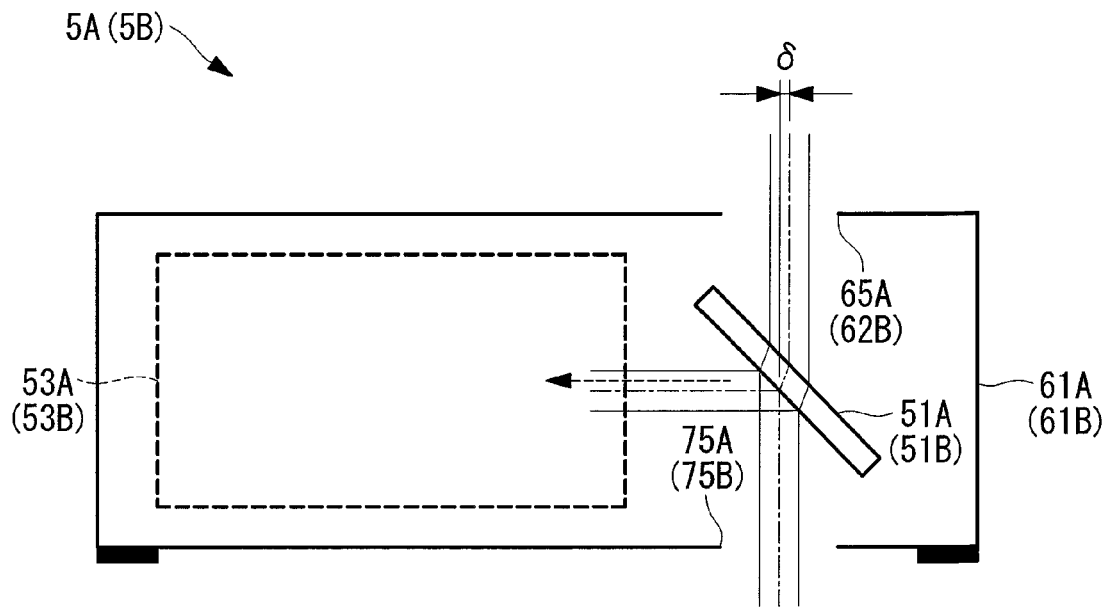
FIG. 8 illustrates deviation of an optical axis of signal light in a splitter of one of the detection units in FIG. 1.

As shown in FIG. 8, in this embodiment, since the splitters 51A and 51B are flat parallel plates, the optical axis of signal light after being transmitted through the splitters 51A and 51B shifts by $\delta$ relative to that of signal light immediately before being incident on the splitters 51A and 51B. $\delta$ is determined based on the thickness and the refractive index of each flat parallel plate. In a flat parallel plate composed of a glass material having a refractive index of about 1.5 and a thickness of 1 mm, $\delta$ is about 0.3 mm. In this embodiment, since the splitters 51A and 51B are positionally set relative to the detector exit ports 65A and 65B and the detector entrance ports 75A and 75B, there is no deviation of the optical axis between the adjacent detection units 5A and 5B. In other words, there is an overall misalignment of $\delta$ in the detection units 5A and 5B.

Figure 9:
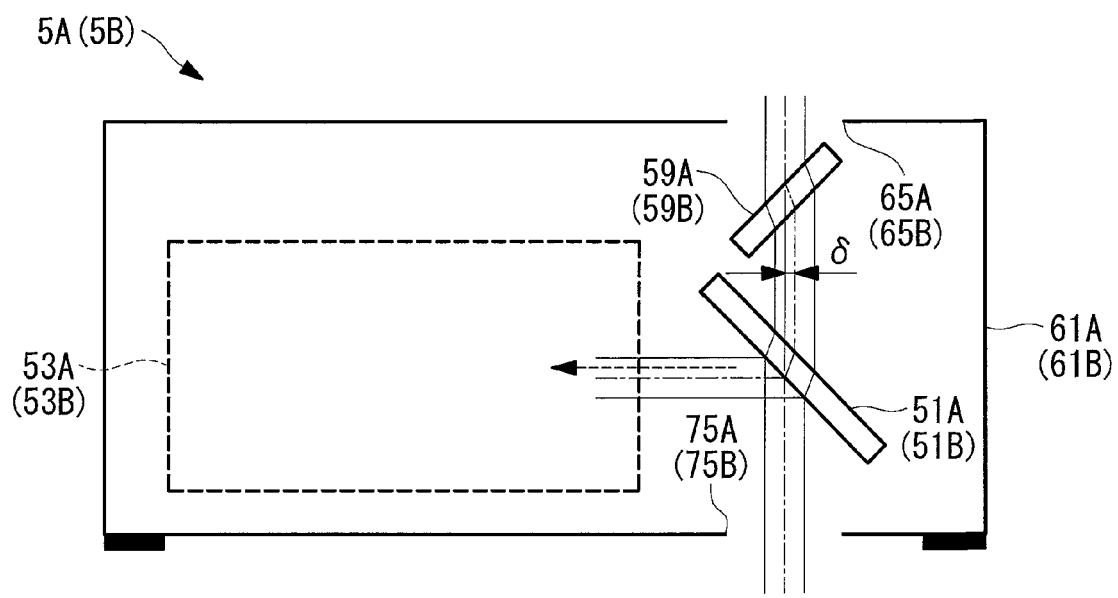
FIG. 9 illustrates a state where the detection unit in FIG. 8 is provided with an optical-axis corrector.

In this case, as shown in FIG. 9, optical-axis correctors 59A and 59B that correct the optical axis of signal light, which has been shifted in the splitters 51A and 51B, by the shifted amount may be provided between the splitters 51A and 51B and the detector exit ports 65A and 65B, respectively.

For example, if flat parallel plates composed of a glass material are used as the splitters 51A and 51B, dummy glass members formed of flat parallel plates that are composed of a glass material having the same thickness as the above flat parallel plates may be used as the optical-axis correctors 59A and 59B. Moreover, the dummy glass members may be tilted at 45° in the opposite direction relative to the splitters 51A and 51B.

Accordingly, signal light transmitted through the splitter 51A or 51B is shifted by the optical-axis corrector 59A or 59B in the opposite direction by the shifted amount in the splitter 51A or 51B so that deviation of the optical axis is corrected, and the signal light subsequently exits through the detector exit port 65A or 65B.

If the splitters 51A and 51B formed of flat parallel plates each have a thickness of 1 mm, the amount by which the optical axis of signal light is shifted by the splitter 51A or 51B is small at, for example, about 0.3 mm. However, if many detection units 5A and 5B are connected, misalignment between the detection units 5A and 5B may impair the external appearance of the confocal laser microscope 100 or may cause interference with peripheral units. As a result of the optical-axis correctors 59A and 59B cancelling the deviation of the optical axis caused by the splitters 51A and 51B, interference with peripheral units surrounding the detection units 5A and 5B as well as external misalignment of the detection units 5A and 5B can be prevented.

Figure 10:
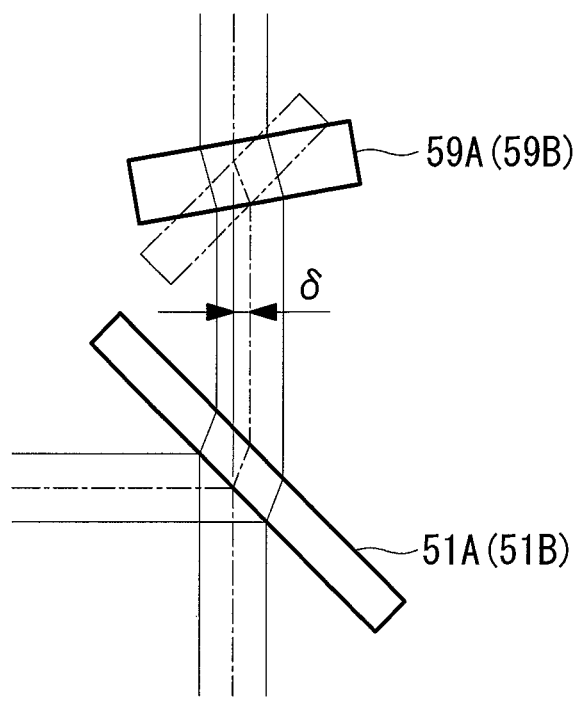
FIG. 10 illustrates a modification in which the thickness and the tilt angle of the optical-axis corrector in FIG. 9 have been changed.

In FIG. 9, although the optical-axis correctors 59A and 59B are formed of flat parallel plates that have the same thickness as the splitters 51A and 51B and that are tilted at 45° in the opposite direction relative to the splitters 51A and 51B, the optical-axis correctors 59A and 59B may be formed so as to be capable of correcting the deviation of the optical axis of signal light caused by the splitters 51A and 51B to its original state. For example, as shown in FIG. 10, flat parallel plates that are thicker than the splitters 51A and 51B may be used as the optical-axis correctors 59A and 59B, and these flat parallel plates may be tilted at an angle smaller than 45° relative to the splitters 51A and 51B.

This embodiment may be modified as follows.

Figure 11:
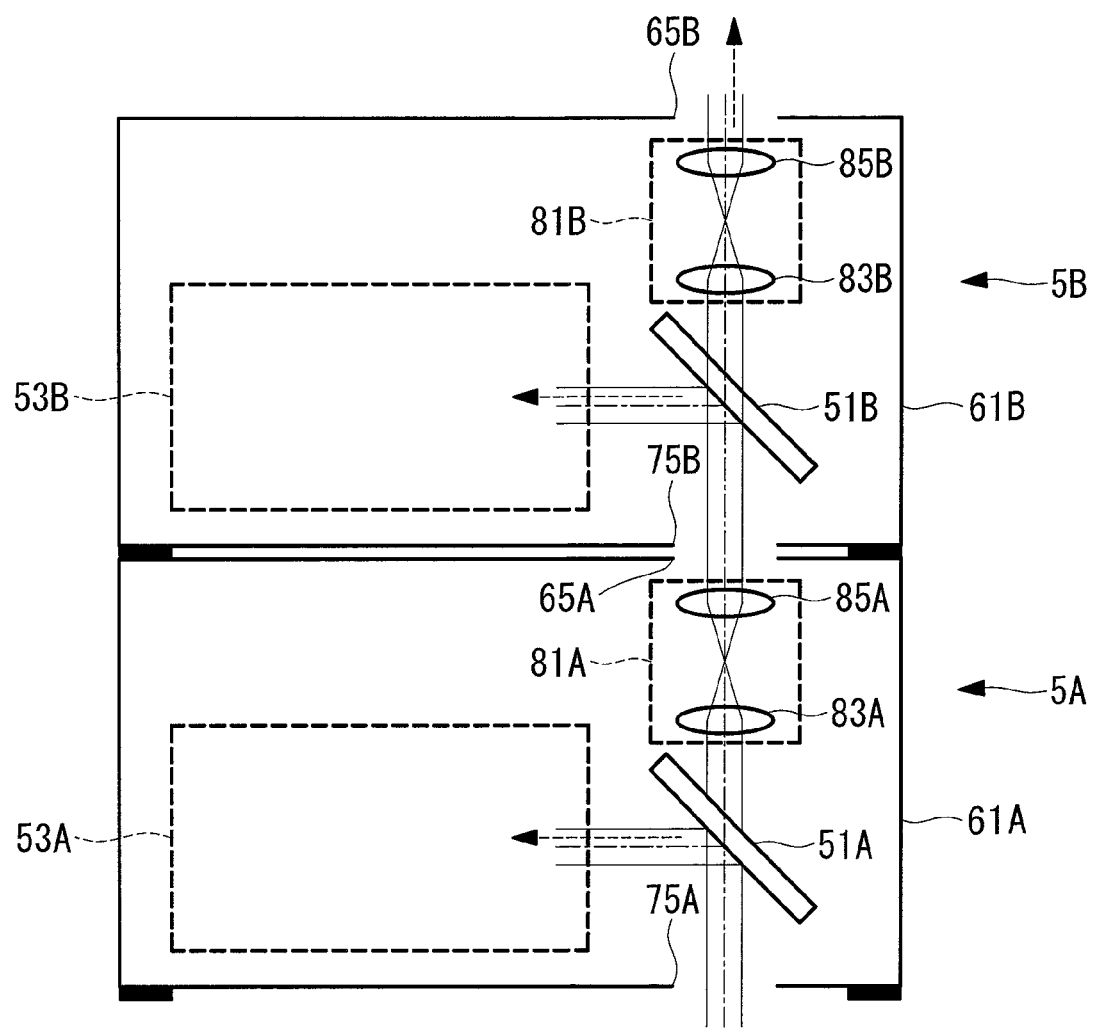
FIG. 11 is a vertical sectional view illustrating the first detection unit and the second detection unit according to a first modification of the first embodiment of the present invention.

As shown in FIG. 11, as a first modification, relay optical systems 81A and 81B that relay signal light entering through the detector entrance ports 75A and 75B without changing the predetermined optical form thereof may be provided. The relay optical systems 81A and 81B may respectively be constituted of, for example, first relay lenses 83A and 83B that converge the signal light and second relay lenses 85A and 85B that convert the signal light converged by the first relay lenses 83A and 83B into collimated light, and may be disposed in the optical paths between the splitters 51A and 51B and the detector exit ports 65A and 65B, respectively.

With this configuration, the signal light transmitted through the splitters 51A and 51B is converged by the first relay lenses 83A and 83B of the relay optical systems 81A and 81B, is subsequently converted into collimated light by the second relay lenses 85A and 85B, and exits through the detector exit ports 65A and 65B in the predetermined optical form. Therefore, with each of the relay optical systems 81A and 81B, light can be made to enter an adjacent detection unit while suppressing an increase in beam diameter caused by a minor increase in angle. Consequently, the number of detectors 57A and 57B can be increased while still maintaining the detection efficiency of the detectors 57A and 57B.

Figure 12:
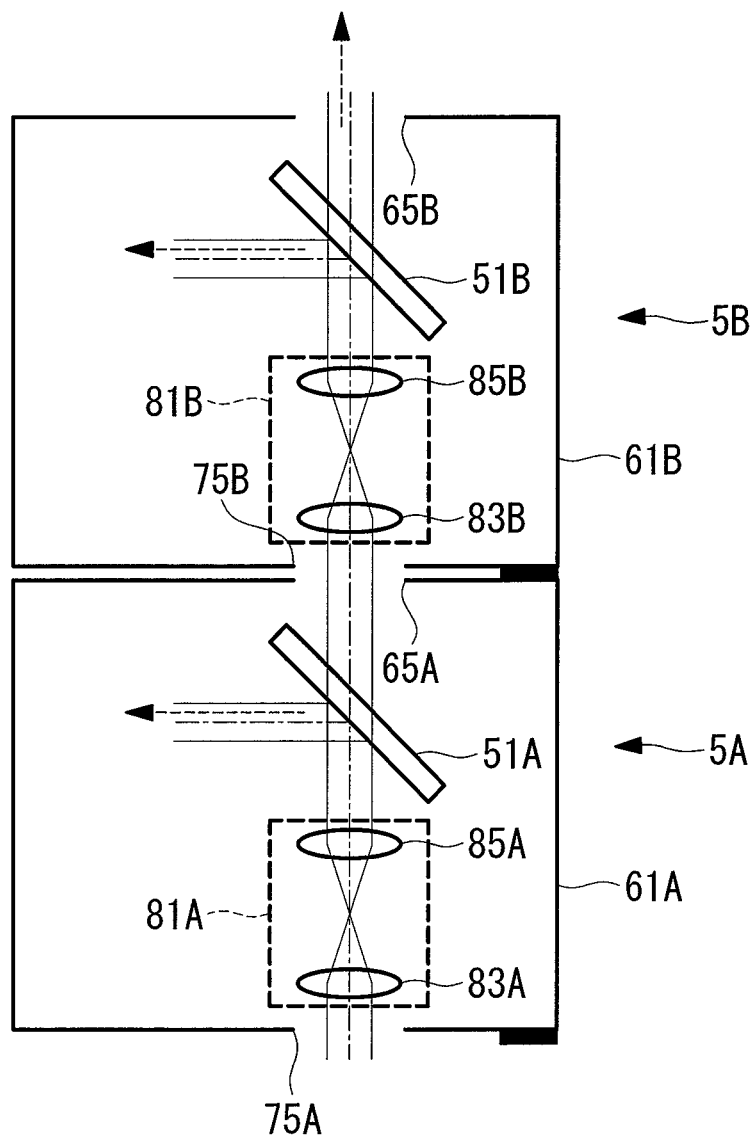
FIG. 12 illustrates another example of the first detection unit and the second detection unit in FIG. 11.

In this modification, for example, as shown in FIG. 12, the relay optical systems 81A and 81B may alternatively be disposed between the detector entrance ports 75A and 75B and the splitters 51A and 51B, respectively. With this configuration, signal light entering through the detector entrance port 75A or 75B is converged by the first relay lens 83A or 83B of the relay optical system 81A or 81B. Subsequently, the signal light is converted into collimated light by the second relay lens 85A or 85B, and the splitter 51A or 51B splits the optical path.

Figure 13:
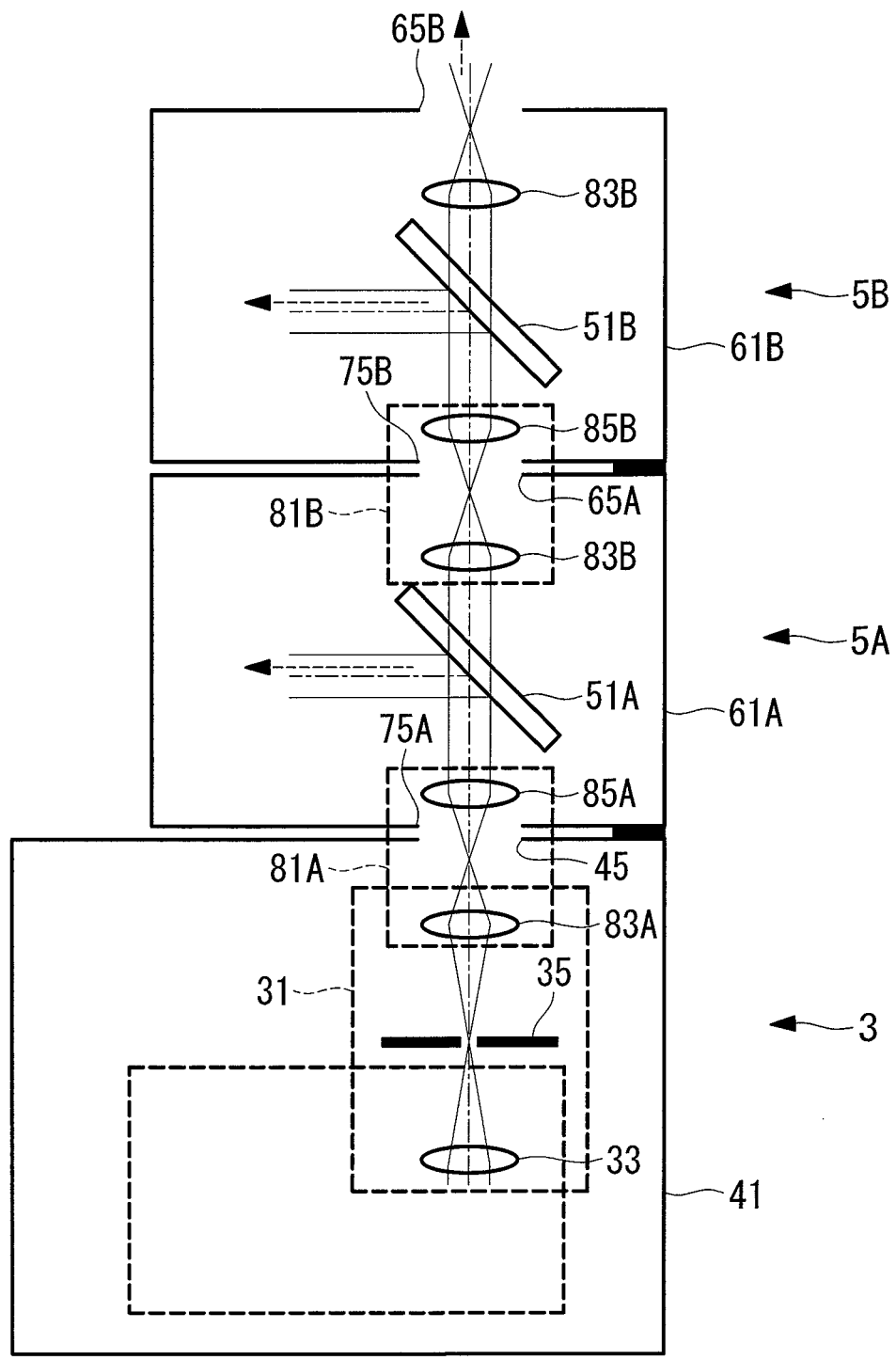
FIG. 13 illustrates yet another example of the first detection unit and the second detection unit in FIG. 11.

Furthermore, in this modification, in place of the collimating lens 37 of the pinhole optical system 31 and the reflecting mirror 13, as shown in FIG. 13, the first relay lens 83A of the relay optical system 81A may be disposed between the pinhole 35 and the scanner exit port 45, and the second relay lens 85A may be disposed between the detector entrance port 75A and the splitter 51A. Moreover, the first relay lens 83B of the other relay optical system 81B may be disposed between the splitter 51A of the first detection unit 5A and the detector exit port 65A, and the second relay lens 85B may be disposed between the detector entrance port 75B and the splitter 51B of the second detection unit 5B. In this case, the first relay lens 83A can be shared with the pinhole optical system 31.

Figure 14:
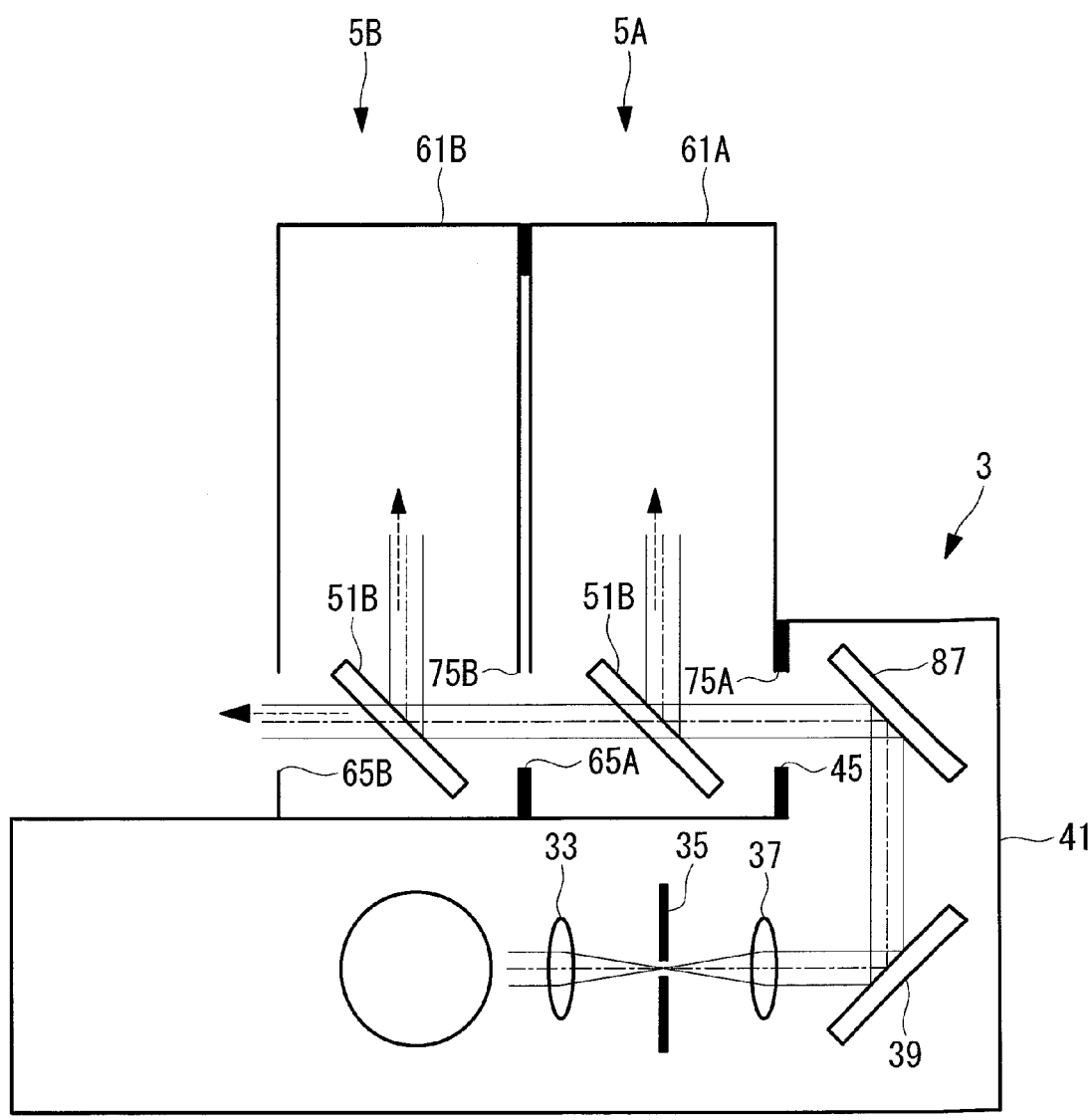
FIG. 14 is a vertical sectional view illustrating the scanner unit, the first detection unit, and the second detection unit according to a second modification of the first embodiment of the present invention.

As a second modification, for example, as shown in FIG. 14, the detection units 5A and 5B may be disposed side-by-side on the upper surface 43 of the scanner housing 41 by changing the orientation of the detection units 5A and 5B such that the optical axis of signal light passing through the detector entrance ports 75A and 75B and the detector exit ports 65A and 65B extends parallel to the upper surface 43 of the scanner housing 41.

In this case, the scanner exit port 45 may be disposed so that the signal light can exit parallel to the upper surface 43 of the scanner housing 41, and a reflecting mirror 87 that reflects the signal light, reflected by the reflecting mirror 13 of the pinhole optical system 31, along the upper surface 43 of the scanner housing 41 may be added. Then, the signal light reflected by the reflecting mirror 87 may exit through the scanner exit port 45 along the upper surface of the scanner housing 41 so as to sequentially enter the detector housings 61A, and 61B. With this configuration, the number of detection channels of the detectors 57A and 57B can be increased even when the confocal laser microscope 100 is limited in height.

Second Embodiment

Next, a detection unit and a confocal laser microscope according to a second embodiment of the present invention will be described.

Figure 15:
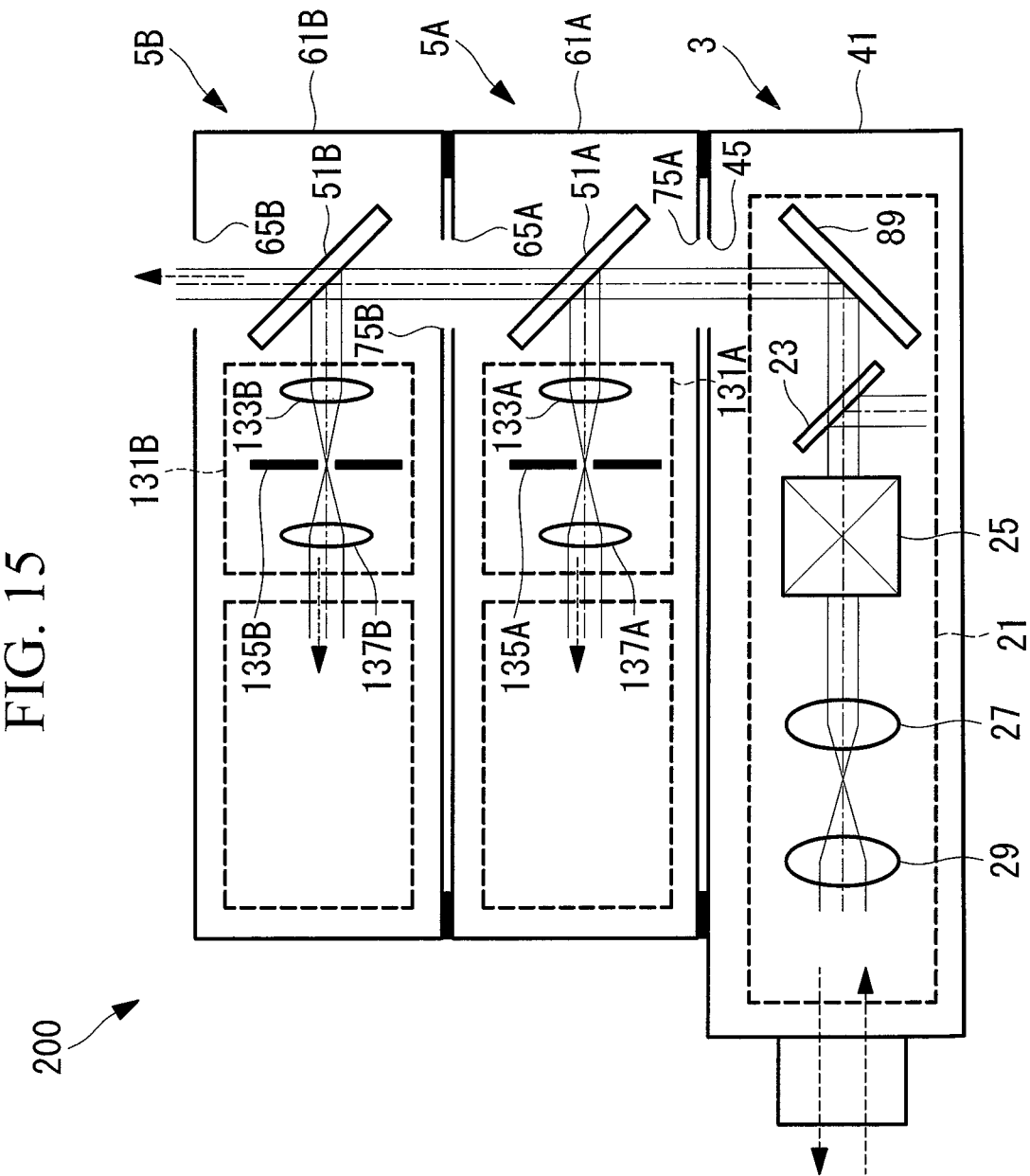
FIG. 15 is a vertical sectional view illustrating detection units and a confocal laser microscope according to a second embodiment of the present invention.

As shown in FIG. 15, a confocal laser microscope 200 according to this embodiment differs from that in the first embodiment in that the scanning optical system 21 includes a reflecting mirror 89 that reflects signal light transmitted through the dichroic mirror 23 toward the scanner exit port 45, and in that the detection units 5A and 5B include pinhole optical systems 131A and 131B, respectively, in place of the pinhole optical system 31.

Sections that are the same as those in the detection units 5A and 5B and the confocal laser microscope 100 according to the first embodiment will be given the same reference characters below, and descriptions thereof will be omitted.

The pinhole optical systems 131A and 131B include imaging lenses 133A and 133B that converge signal light split by the splitters 51A and 51B, pinholes 135A and 135B, and collimating lenses 137A and 137B, respectively. The imaging lenses 133A and 133B, the pinholes 135A and 135B, and the collimating lenses 137A and 137B are arranged between the splitters 51A and 51B and the detection optical systems 53A and 53B in the widthwise direction of the detector housings 61A and 61B, respectively.

With the confocal laser microscope 200 having the above-described configuration, signal light de-scanned by the scanner 25 is transmitted through the dichroic mirror 23 and is subsequently reflected by the reflecting mirror 89 so as to exit outward in the form of a collimated beam through the scanner exit port 45.

The signal light exiting through the scanner exit port 45 enters the detector housing 61A in the form of a collimated beam through the detector entrance port 75A of the first detection unit 5A, and the splitter 51A splits the optical path in accordance with the wavelength. Signal light with a predetermined wavelength reflected by the splitter 51A is converged by the imaging lens 133A of the pinhole optical system 131A. Of the converged signal light, only the signal light generated at the focal position of the objective lens 15 on the sample passes through the pinhole 135A. The signal light passed through the pinhole 135A is converted into collimated light by the collimating lens 137A and is detected by the detection optical system 53A. On the other hand, signal light with other wavelengths transmitted through the splitter 51A exits outward in the form of a collimated beam through the detector exit port 65A.

The signal light exiting through the detector exit port 65A enters the detector housing 61B in the form of a collimated beam through the detector entrance port 75B of the second detection unit 5B. Then, similar to the first detection unit 5A, signal light with a predetermined wavelength split by the splitter 51B is detected by the detection optical system 53B via the pinhole optical system 131B, whereas signal light with other wavelengths exits outward in the form of a collimated beam through the detector exit port 65B.

With the confocal laser microscope 200 according to this embodiment, the pinhole diameters of the pinholes 135A and 135B can be changed in accordance with the wavelength of fluorescence to be detected by the respective detection units 5A and 5B. Therefore, the signal light can be detected in more detail, thereby allowing for improved user-friendliness.

Although the embodiments of the present invention have been described above in detail with reference to the drawings, specific configurations are not limited to the embodiments and may include, for example, design modifications so long as they do not depart from the scope of the present invention. For example, the present invention is not limited to the embodiments and modifications described above and may be applied to an embodiment achieved by appropriately combining these embodiments and modifications; the invention is not limited in particular.

Furthermore, for example, although two detection units 5A and 5B are described as an example in each of the above-described embodiments, the confocal laser microscope 100 may include three or more detection units with the same configuration as the detection units 5A and 5B. In this case, the third and subsequent detection units may be sequentially adjacently disposed in a manner similar to how the first detection unit 5A and the second detection unit 5B are attached to each other.

Furthermore, in each of the above-described embodiments, the scanner housing 41 and the detector housing 61A are positioned relative to each other and the detector housings 61A and 61B are positioned relative to each other by using the positioning pins 47, 48, 67A, 67B, 68A, and 68B. Alternatively, the housings may be simply attached to each other such that the scanner exit port 45 of the scanner unit 3 is aligned with the detector entrance port 75A of the first detection unit 5A, and the detector exit port 65A of the first detection unit 5A is aligned with the detector entrance port 75B of the second detection unit 5B. For example, by using bidirectional stoppers, for example, the scanner housing 41 and the detector housing 61A may be positioned relative to each other, and the detector housings 61A and 61B may be positioned relative to each other.

In each of the above-described embodiments, the detection units 5A and 5B are described as having identical configurations. Alternatively, for example, the detectors 57A and 57B used may be of different types, such as photomultiplier tubes with higher sensitivity, and the detection optical systems 53A and 53B may be changed in accordance with the types of detectors 57A and 57B.

In this case, in a state where the housings 41, 61A, and 61B are attached to one another using the same attachment method as that used for the scanner unit 3 and the detection units 5A and 5B, the scanner exit port 45 of the scanner unit 3 may simply be aligned with the detector entrance port 75A of the first detection unit 5A, and the detector exit port 65A of the first detection unit 5A may simply be aligned with the detector entrance port 75B of the second detection unit 5B.

In the embodiments and modifications described above, the scanner unit 3, the first detection unit 5A, and the second detection unit 5B are disposed in this order as an example. Alternatively, for example, the units following the scanner unit 3 may be freely disposed such that the second detection unit 5B and the first detection unit 5A may be disposed in this order. In that case, the attachment method is similar to the case where the scanner unit 3, the first detection unit 5A, and the second detection unit 5B are disposed in this order.

REFERENCE SIGNS LIST 1 microscope body
3 scanner unit
5A first detection unit (detection unit)
5B second detection unit (detection unit)
21 scanning optical system
35 pinhole
41 scanner housing
45 scanner exit port
51A, 51B splitter
57A, 57B detector (detecting section)
61A, 61B detector housing
65A, 65B detector exit port
75A, 75B detector entrance port
81A, 81B relay optical system
100, 200 confocal laser microscope
S sample

The invention claimed is:

1. A confocal laser microscope comprising:
a scanner unit that includes a scanning optical system and a scanner housing, the scanning optical system reflecting illumination light emitted from a light source, scanning the illumination light over a sample, reflecting returning light from the sample at the same position as a reflecting position of the illumination light, and returning the returning light along an optical path of the illumination light, the scanner housing accommodating the scanning optical system therein and having a scanner exit port through which the returning light returned along the optical path of the illumination light by the scanning optical system exits outward in a predetermined optical form; and
a plurality of the detection units
wherein each detection unit comprises:
a detector entrance port through which light in a predetermined optical form enters;
a detecting section that detects at least a portion of the light entering through the detector entrance port;
a detector exit port through which at least another portion of the light entering through the detector entrance port can exit in the same optical form, and
a detector housing that accommodates the detecting section therein and that has the detector entrance port and the detector exit port, and
wherein the scanner housing and each detector housing are configured to be detachably attachable to each other so that, when attached to each other, optical axes of returning light exiting through the scanner exit port and returning light entering through the detector entrance port are aligned, and wherein the detector housings are configured to be detachably attachable to each other so that, when attached to each other, optical axes of returning light exiting through the detector exit port and returning light entering through the detector entrance port are aligned.

2. The confocal laser microscope according to claim 1, wherein the scanner unit includes a pinhole disposed at a position conjugate with respect to the sample, and wherein the pinhole limits a bundle of rays of the returning light exiting through the scanner exit port.

3. The confocal laser microscope according to claim 1, wherein each detection unit is configured so that the detector entrance port and the detector exit port are disposed in an optical axis of the returning light exiting through the scanner exit port in a state where each detector housing is attached to the scanner housing, and each detection unit is configured so that the detector entrance port and the detector exit port are disposed in an optical axis of the returning light exiting through the detector exit port of the other detector housing in a state where the detector housing is attached to another detector housing.

4. The confocal laser microscope according to claim 1, wherein a first one of the detection units is attached to the scanner unit, and a second of the detection units is attached to the first one of the detection units, and wherein detection sensitivities between the detecting section of the first one of the detection units and the detecting section of the second of the detection units are different from each other.

5. The detection unit according to claim 1, wherein each of the detection units further comprises a splitter that splits an optical path of the light entering through the detector entrance port, causes light in one of the split optical paths to enter the detecting section, and causes light in another optical path to enter the detector exit port.

6. The detection unit according to claim 1, wherein the light entering through the detector entrance port of each of the detection units has the optical form of collimated light.

7. The detection unit according to claim 6, wherein each of the detection units further comprises a relay optical system that relays the light entering through the detector entrance port without changing the predetermined optical form thereof.

\* \* \* \* \*